United States Patent
Roberts

(10) Patent No.: US 9,088,200 B2
(45) Date of Patent: Jul. 21, 2015

(54) ELECTROMECHANICAL GENERATOR FOR CONVERTING MECHANICAL VIBRATIONAL ENERGY INTO ELECTRICAL ENERGY

(71) Applicant: Perpetuum LTD, Southampton, Hampshire (GB)

(72) Inventor: Stephen Roberts, Winchester (GB)

(73) Assignee: PERPETUUM LTD, Chilworth Science Park, Southampton, Hampshire (GB)

(*) Notice: Subject to any disclaimer, the term of this patent is extended or adjusted under 35 U.S.C. 154(b) by 0 days.

(21) Appl. No.: 13/932,402

(22) Filed: Jul. 1, 2013

(65) Prior Publication Data

US 2013/0300219 A1  Nov. 14, 2013

Related U.S. Application Data

(62) Division of application No. 12/744,904, filed as application No. PCT/GB2008/003921 on Nov. 24, 2008, now Pat. No. 8,492,937.

(30) Foreign Application Priority Data

Nov. 27, 2007 (GB) .................. 0723258.0

(51) Int. Cl.
*H02K 35/00* (2006.01)
*H02K 1/34* (2006.01)

(52) U.S. Cl.
CPC . *H02K 35/00* (2013.01); *H02K 1/34* (2013.01)

(58) Field of Classification Search
CPC ....... H02K 35/00; H02K 7/065; H02K 33/00; F04B 35/04
USPC ........... 310/25, 29, 32, 22–24, 15, 17, 28, 36, 310/38
See application file for complete search history.

(56) References Cited

U.S. PATENT DOCUMENTS

| | | | | |
|---|---|---|---|---|
| 5,894,263 A * | 4/1999 | Shimakawa et al. | ....... | 340/388.1 |
| 6,533,593 B1 * | 3/2003 | Ishii | ............................ | 439/188 |
| 6,681,025 B2 * | 1/2004 | Maekawa | ................... | 340/7.58 |
| 7,586,220 B2 * | 9/2009 | Roberts | ......................... | 310/15 |
| 2001/0022485 A1 * | 9/2001 | Oda et al. | ................. | 310/323.04 |
| 2003/0034705 A1 * | 2/2003 | Hakansson | ..................... | 310/81 |
| 2007/0085425 A1 * | 4/2007 | Hirashima | ..................... | 310/15 |
| 2007/0085495 A1 * | 4/2007 | Suzuki et al. | ................. | 318/128 |
| 2012/0279234 A1 * | 11/2012 | Aigouy et al. | ............. | 310/12.04 |

FOREIGN PATENT DOCUMENTS

JP  2002339863 A  11/2002

* cited by examiner

*Primary Examiner* — Michael Andrews
(74) *Attorney, Agent, or Firm* — Colin P. Cahoon; Shaukat A. Karjeker; Carstens & Cahoon, LLP

(57) ABSTRACT

An electromechanical generator for converting mechanical vibrational energy into electrical energy. The electromechanical generator has a housing and an electrically conductive coil assembly movably mounted in the housing. The coil assembly has radially inner and outer sides, and upper and lower edges. A mount for the coil assembly extends inwardly of the radially inner side for mounting the coil assembly for linear vibrational motion along an axis. A first biasing device is mounted between the housing and the mount to bias the electrically conductive coil assembly in opposed directions along the axis towards a central coil position, a magnetic core assembly is movably mounted in the housing for linear vibrational motion along the axis, and a second biasing device is mounted between the housing and the magnetic core assembly to bias the magnetic core assembly in opposed directions along the axis towards a central magnet position.

2 Claims, 2 Drawing Sheets

ELECTROMECHANICAL GENERATOR FOR CONVERTING MECHANICAL VIBRATIONAL ENERGY INTO ELECTRICAL ENERGY

This application is a divisional application of U.S. Ser. No. 12/744,904 filed Sep. 16, 2010, and claims priority to U.S. Ser. No. 12/744,904, which is a national phase application of PCT Application No. PCT/GB2008/003921 filed Nov. 24, 2008, which claims priority to Great Britain Application No. 0723258.0 filed Nov. 27, 2007.

BACKGROUND TO THE INVENTION

The present invention relates to an electromechanical generator for converting mechanical vibrational energy into electrical energy. In particular, the present invention relates to such a device which is a miniature generator capable of converting ambient vibration energy into electrical energy for use, for example, in powering intelligent sensor systems. Such a system can be used in many areas where there is an economical or operational advantage in the elimination of power cables or batteries.

DESCRIPTION OF THE PRIOR ART

It is known to use an electromechanical generator for harvesting useful electrical power from ambient vibrations, e.g. for powering wireless sensors. A typical magnet-coil generator consists of a spring-mass combination attached to a magnet or coil in such a manner that when the system vibrates, a coil cuts through the flux formed by a magnetic core.

It is generally known in the art that as a rule the greater the mass of the spring-mass combination of the magnetic core generator, the greater the output electrical power. An energy harvester needs to produce high power over a wide bandwidth because the vibration frequency is not known before deployment, or could change. High power over a wide bandwidth for a resonant vibration energy harvester requires a high mass, a high Q and a high magnetic coupling factor.

US-A-2003/0173725 discloses a vibration damping device that converts mechanical energy into electrical energy and is mounted as a beater in a known manner in an aircraft, in particular a helicopter. Such a device is not designed for use as an electromechanical generator for efficiently harvesting a high amount of electrical power from ambient vibrations, e.g. for powering wireless sensors.

SUMMARY OF THE INVENTION

The present invention aims to provide a device that maximizes all three of these parameters, i.e. high mass, a high Q and a high magnetic coupling factor in a practical manner.

The present invention accordingly provides an electromechanical generator for converting mechanical vibrational energy into electrical energy having the features of claim 1, claim 15 or claim 17. Preferred features are defined in the dependent claims.

In the electromechanical generator of the preferred embodiment of the present invention a high moving mass can be achieved by filling almost all of the internal space with a metallic magnetic core assembly. This can be achieved at least partly because flat springs at opposed ends of the magnetic core assembly and of the electrical coil assembly are volume efficient. In addition, a high Q comes from the fact that the "enclosed" structure of the magnetic core assembly leaks very little flux, and so there is very little eddy current in the surrounding material of the stationary housing. Accordingly, little clearance needs to be kept between the moving magnetic core assembly and the housing, allowing more moving mass. A high magnetic coupling comes also from the enclosed nature of the magnetic core assembly where very little flux leaks out—almost all the magnetic flux gets channeled through the coil. Furthermore, by providing additionally that the electrical coil assembly has a mass that vibrates, in addition to the vibrating magnetic core assembly, and preferably at different natural resonant frequencies, the electromagnetic coupling between the coil and the magnetic flux can be maximized over a broad range of vibrational frequencies. This can provide a high electrical output over a range of operational applications, where the input vibrational energy may vary in frequency, for example over time.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

The electromechanical generator of the present invention is a resonant generator known in the art as "velocity-damped" where all of the work done by the movement of the inertial mass relative to the housing is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described below.

Figure 1:
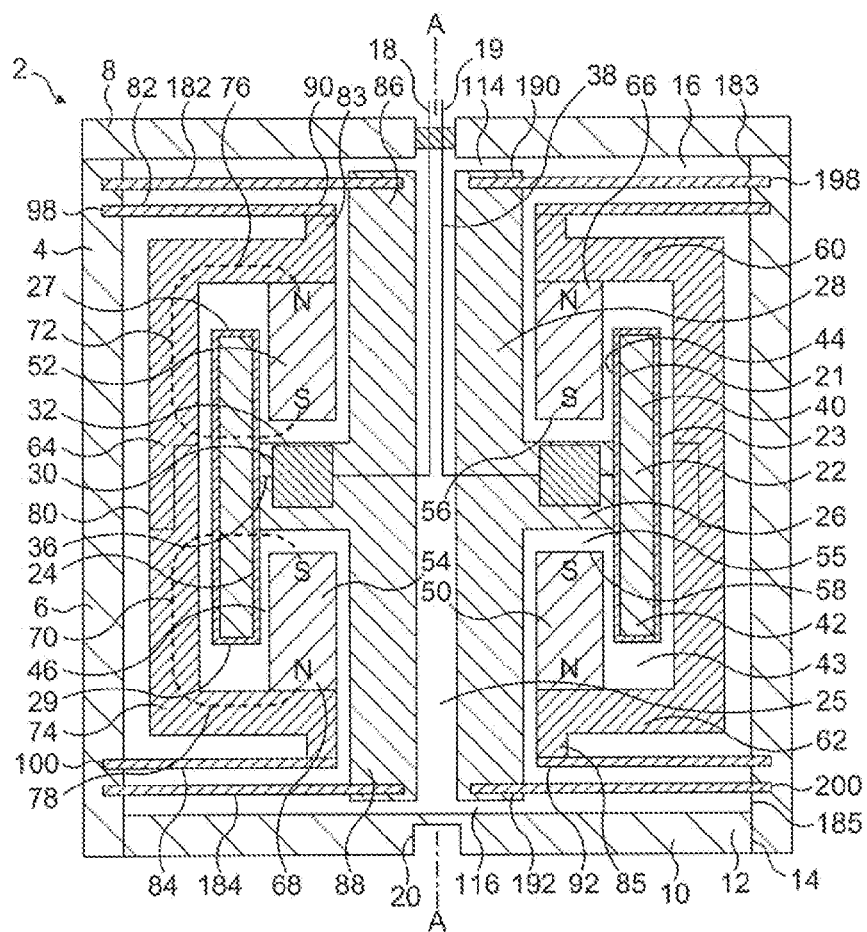
FIG. 1 is a schematic side section through an electromechanical generator for converting mechanical vibrational energy into electrical energy in accordance with an embodiment of the present invention.
Figure 2:
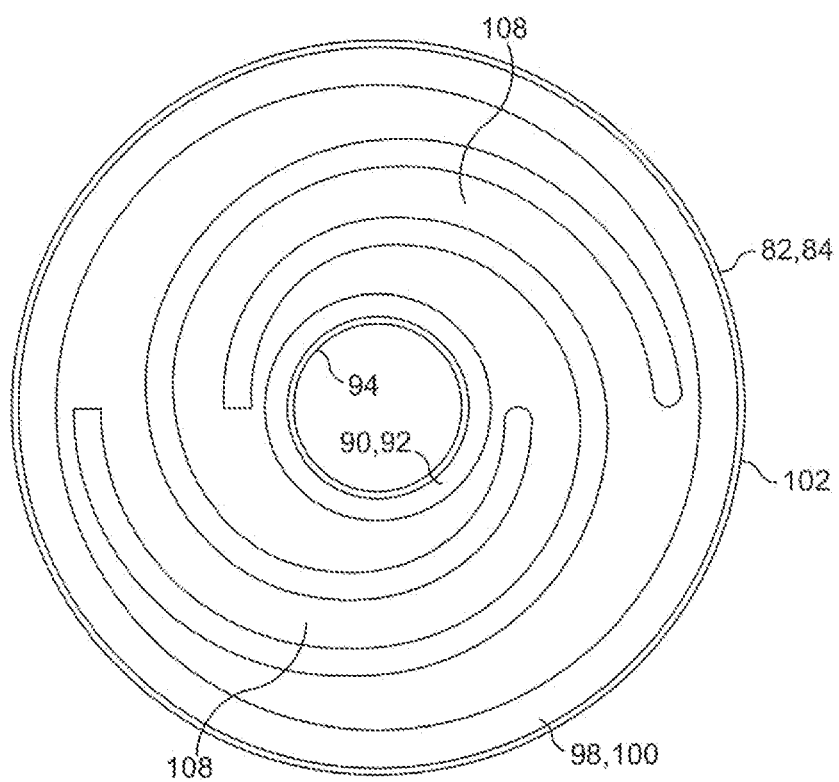
FIG. 2 is a schematic plan view of a first spring in the electromechanical generator of FIG. 1.
Figure 3:
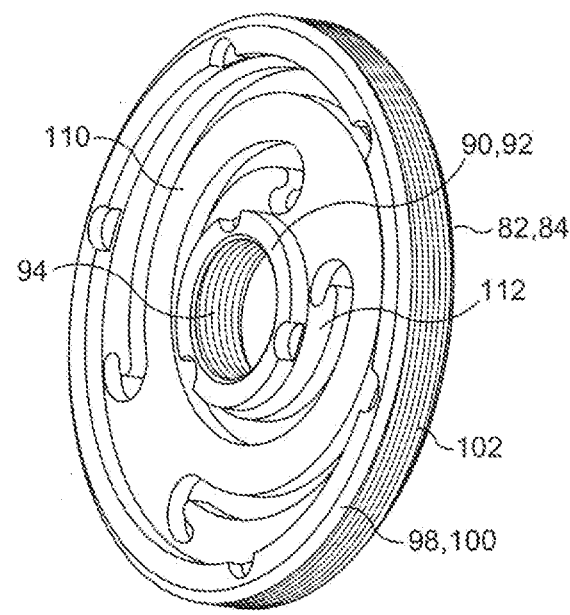
FIG. 3 is a schematic perspective view of a second spring in the electromechanical generator of FIG. 1.

FIGS. 1 to 3 show an electromechanical generator 2 for converting mechanical vibrational energy into electrical energy in accordance with an embodiment of the present invention. The electromechanical generator 2 comprises a housing 4. The housing 4 comprises an annular outer peripheral wall 6, an integral circular lid 8 and a circular base 10. The base 10 is securely fitted at its circular edge 12 to a lower edge 14 of the outer peripheral wall 6, for example by means of adhesive or a threaded coupling (not shown). The outer peripheral wall 6 defines a cylindrical cross-section interior volume 16, having an axis of rotation A-A. A circular opening 18 is formed through the lid 8, which opening 18 is coaxial with the cylindrical cross-section interior volume 16. The base 10 is provided with a fitting 20 in its outer surface for securely mounting the electromechanical generator 2 to a support (not shown).

An electrically conductive coil 22 is movably mounted in the housing 4 for linear vibrational motion along the axis A-A. The coil 22 is circular and is coaxial with the housing 4, and has radially inner and outer sides 21, 23, the sides 21, 23 extending parallel to the axis of rotation A-A. The coil 22 has upper and lower edges 27, 29. The coil 22 is mounted, as an assembly, within an annular coil support 24 which is located substantially midway in a radial direction between the axis A-A and the outer peripheral wall 6, and also substantially midway in an axial direction between the lid 8 and the base 10. The coil support 24 has an integral annular central mounting portion 26 that extends radially inwardly from a central part of the coil 22 and is mounted on a central tubular body 28.

The central tubular body 28 is movably mounted to the housing 4 by a pair of opposed plate springs 182, 184. One spring 182, 184 is located between the housing 4, in particular the annular outer peripheral wall 6, and a respective upper or lower end 86, 88 of the central tubular body 28. A radially inner annular edge 190, 192 of each spring 182, 184 is securely fitted to the respective upper or lower end 86, 88 of the central tubular body 28. A radially outer annular edge 198, 200 of each spring 182, 184 is securely fitted to a respective upper or lower end 183, 185 of the annular outer peripheral wall 6. The fittings may be achieved, for example, by screw threads, or by the plate spring annular edge, inner and/or outer, being received in a respective groove.

In an alternative embodiment, the springs 182, 184 may be securely fitted to the lid 8 and the base 10 respectively rather than to the annular outer peripheral wall 6.

Preferably the coil support 24 is made from a very low-conductivity material, such as glass-loaded plastic. Preferably the central tubular body 28 is made from a low-permeability, low-conductivity, but high-elastic-modulus material such as 316 stainless steel.

The mounting portion 26 defines an annular recess 30 in which is received circuitry 32 for electrically conditioning the electrical output of the coil 20, for example by voltage regulation. The circuitry 32 is encapsulated within the annular recess 30 by a plastic or rubber sealing material 34, which seals and protects the circuitry 32 against undesired environmental influences, such as humidity, liquids, etc. The coil 22 is connected the circuitry 32 by first wires 36 and in turn the circuitry 32 has second wires 38 extending therefrom through the opening 18 in the lid 8 for connecting to external circuitry (not shown). The opening 18 may be sealed by a hermetic seal 19, for example of glass, to prevent the ingress of moisture into the housing 4. The second wires 38 extend through a central elongate bore 25 in the central tubular body 28 and are flexibly mounted so as to accommodate vibrational movement of the central tubular body 28, carrying the coil 22, along the axis A-A.

The coil 22 may comprise a single coil or may have spaced first and second coil portions thereof respectively located above and below the mounting portion 26.

A magnetic core assembly 50 is also movably mounted in the housing 4 for linear vibrational motion along the axis A-A. The magnetic core assembly 50 is rotationally symmetric and includes a pair of axially aligned annular magnets 52, 54, each typically a rare earth permanent magnet having a high magnetic field strength The magnets 52, 54 are mounted on opposite sides, above and below, of the mounting portion 26 and radially inwardly of the coil 20. The magnets 52, 54 are each axially spaced from the mounting portion 26, and define a gap 55 through which the mounting portion 26 extends. As shown in FIG. 1, the magnets 52, 54 are aligned so that their identical poles 56, 58 (e.g. the south (S) poles as shown in FIG. 1) face each other on opposite sides of the mounting portion 26.

The magnetic core assembly 50 also includes a common ferromagnetic body 64, for example of mild steel or soft iron. The magnets 52, 54 are mounted between opposed annular arms 60, 62 of the common ferromagnetic body 64. The poles 66, 68 (e.g. the north (N) poles) of the magnets 52, 54 that face away from each other in an axially outward direction are each mounted on a respective annular arm 60, 62. The common ferromagnetic body 64 also includes a tubular portion 70. The tubular portion 70 may be comprised of two mutually interlocking tubular members 72, 74, each integral with a respective annular arm 60, 62. In this way, upper and lower coil parts 40, 42 are respectively at least partly located between tubular portion 70 of the common ferromagnetic body 64 and one of the magnets 52, 54.

This magnetic core assembly 50 of the radially outer common ferromagnetic body 64 coupled to the radially inner magnets 52, 54 defines therebetween an annular enclosed cavity 43 in which the coil 22 is received. The magnets 52, 54 are in the vicinity of the inner side 21 of the coil 22 and the common ferromagnetic body 64 is in the vicinity the outer side 23 of the coil 22. The magnets 52, 54 and the common ferromagnetic body 64 are slightly spaced from the coils 22 to permit relative translational movement therebetween. The magnetic core assembly 50 encloses the coil 22 on the radially outer side 23 and on the upper and lower edges 27, 29, and on a part of the radially inner side 21, the magnetic core assembly having the gap 55 on a radially inner portion thereof, comprised of the magnets 52, 54, through which the mounting portion 26 extends. The common ferromagnetic body 64 comprises the radially outer and upper and lower portions of the magnetic core assembly 50. The magnetic core assembly 50 therefore has a substantially C-shaped cross-section and is rotationally symmetric.

The cavity 43 has respective cavity portions 44, 46 between each of the first and second coil portions 40, 42 and the central tubular body 28, and above or below, respectively, the mounting portion 26.

The common ferromagnetic body 64 is composed of a ferromagnetic material having a high magnetic permeability, and a high mass, such as mild steel or soft iron. The assembly of the common ferromagnetic body 64 and the magnets 52, 54 therefore forms two axially spaced magnetic circuits 76, 78 of the magnetic core assembly 50, the magnetic flux being shown by the dashed lines in FIG. 1, one for each magnet 52, 54. The limits of the lines of magnetic flux each magnetic circuit 76, 78 are defined by the respective annular arm 60, 62 and tubular member 72, 74, which substantially prevents magnetic flux from each magnet 52, 54 extending axially or radially outwardly from the common ferromagnetic body 64. Since the opposed magnets 52, 54 face each other with common poles 56, 58 (e.g. S poles), at the central region 80 of the magnetic core assembly 50 the magnetic flux of the opposed magnetic circuits 76, 78 are in opposition thereby directing the magnetic flux radially outwardly towards the common ferromagnetic body 64.

The resultant effect is that a single magnetic core assembly 50 comprises two separate magnets 52, 54 and each has a respective magnetic circuit 76, 78 in which a very high proportion of the magnetic flux is constrained to pass through the respective coil portion 40, 42. This in turn provides a very high degree of magnetic coupling between the magnets 52, 54 and the coil 22. Consequently, any relative movement between the magnets 52, 54 and the coil 22, in particular as described below by linear axial resonant movement of both the magnetic core assembly 50 and the coil 22, produces a very high electrical power output at the coil 22.

The common ferromagnetic body 64 is movably mounted to the housing 4, in particular the annular outer peripheral wall 6, by a pair of opposed plate springs 82, 84. One spring 82, 84 is located between each respective upper or lower end 83, 85 of the common ferromagnetic body 64 and the annular outer peripheral wall 6. A radially inner annular edge 90, 92 of each spring 82, 84 is securely fitted to the respective upper or lower end 83, 85 of the common ferromagnetic body 64. A radially outer annular edge 98, 100 of each spring 82, 84 is securely fitted to the respective upper or lower end 183, 185 of the annular outer peripheral wall 6.

As shown in FIG. 2, in one alternative arrangement each spring 82, 84 has a spiral configuration, with plural spiral arms 108 extending between the radially inner annular edge 90, 92 and the radially outer annular edge 98, 100. The springs 182, 184 may have a similar construction.

As shown in FIG. 3, in another alternative arrangement each spring 82, 84 has a stepped yoke configuration, with plural eccentric yokes 110, 112 extending in a cascading stepwise manner between the radially inner annular edge 90, 92 and the radially outer annular edge 98, 100. Again, the springs 182, 184 may have a similar construction. The radially outer annular edge 98, 100 is also shown as having a helically threaded surface 102 which can fix the spring to a corresponding surface in the wall 6. The radially inner annular edge 90, 92 is also shown as having a helically threaded surface 94 which can fix the spring to a corresponding surface on the central tubular member 28 or the ferromagnetic body 64 respectively.

Figure 4:
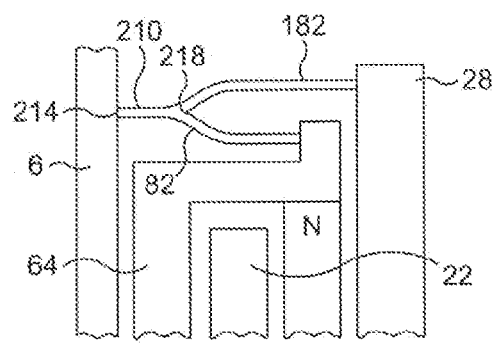
FIG. 4 is a schematic perspective view of part of an alternative spring construction for use in the electromechanical generator of FIG. 1.

As shown in FIG. 4, in another alternative arrangement each spring 82 is connected to a respective spring 182 by a common spring portion 210. Each common spring portion 210 has a radially outer annular edge 214 that is fitted to the housing 4, and a radially inner annular edge 218 from which the upper springs 82, 182 radially inwardly extend. A similar common spring construction is provided for the lower springs 84, 184. Such a unitary spring element is less expensive to produce and assemble than two separate springs at each end of the device.

The two springs 82, 84 each apply the same mechanical biasing force against the magnet assembly 50 when the magnetic core assembly 50 is moved away from a central equilibrium position. The two springs 82, 84 preferably have the same spring constant.

Correspondingly, the two springs 182, 184 each apply the same mechanical biasing force against the electrically conductive coil 22 assembly when the electrically conductive coil 22 assembly is moved away from a central equilibrium position. The two springs 182, 184 preferably have the same spring constant.

The respective biasing devices for the electrically conductive coil assembly and the magnetic core assembly are adapted to cause the electrically conductive coil assembly and the magnetic core assembly to vibrate independently, and preferably to have respective different natural resonant frequencies. This provides that the electrical coil assembly vibrates at a first frequency and the magnetic core assembly vibrates at a second frequency for any given input mechanical vibration. This can provide that the electromagnetic coupling between the coil and the magnetic flux can be maximized over a broad range of input vibrational frequencies. This can provide a high electrical output over a range of operational applications, where the input vibrational energy may vary in frequency, for example over time.

The provision of a pair of plate springs 82, 84 at opposed axial ends of the movable magnetic core assembly 50, and also a pair of plate springs 182, 184 at opposed axial ends of the movable electrically conductive coil 22 assembly, provides a structure that can not only provide a sufficient spring biased restoring force on the magnetic core assembly 50 and on the electrically conductive coil 22 assembly respectively to bias the respective assembly towards an axially central position but also takes up substantially minimum volume within the housing 4. In particular, the location of the springs 82, 84 at opposed axial ends of the movable magnetic core assembly 50 enables the magnetic core assembly 50 to extend radially outwardly substantially as far as the interior radial limits of the housing 4. This maximizes the size of the magnetic core assembly 50 for a given interior volume 16, which not only maximizes the magnetic coupling, but also importantly permits the mass of the movable magnetic core assembly to be correspondingly maximized. As known in the art, there is a desire to maximize the mass of the movable magnetic core assembly in a resonant vibrational electromagnetic energy harvester because this increases the output electrical power. The plate springs 182, 184 for the movable electrically conductive coil 22 assembly take up only a small fraction of the longitudinal length of the interior volume 16, leaving a large useful working space to accommodate the moving electrical coil assembly and the moving magnet assembly.

The provision of a pair of plate springs 82, 84 also avoids the need for expensive and cumbersome helical springs surrounding the movable magnetic core assembly. This decreases the manufacturing cost by reducing the component cost. This applies correspondingly for the plate springs 182, 184 for the moving electrical coil assembly.

The high degree of magnetic coupling between the movable magnetic core assembly and the movable coil, and the high mass of the movable magnetic core assembly and also the mass of the moving electrical coil assembly, enables the two resonant frequencies readily to be tuned accurately to a respective desired value, and also permits a high self-restoring force to be applied to both the movable magnetic core assembly and the moving electrical coil assembly during their resonant oscillation to minimize the amplitude of the oscillation. Since the amplitude is limited, the springs 82, 84 and 182, 184 are only ever deformed by a very small degree, well within their linear spring characteristics. Typically, the gap 114, 116 between the ends 27, 29 of the central tubular body 28 and the lid 8 or base 10 respectively is about 1 mm, and the maximum amplitude is accordingly less than this distance. Again, this maximizes the useful volume 16 of the housing 4 in an axial direction.

The springs 82, 84 and 182, 184 bias, back towards the respective central position, the magnetic core assembly 50 and the electrical coil 22 assembly which can each move axially along the axis A-A when the electromechanical generator 2 is subjected to an applied mechanical force, in particular a mechanical vibration, having at least a component along the axis A-A. The springs 82, 84 and 182, 184 have a high stiffness in the lateral, i.e. radial, direction so as substantially to prevent non-axial movement of the magnetic core assembly 50 and the electrical coil 22 assembly.

The interior volume 16 of the housing 4 may include a gas. The housing 4 may hermetically seal the interior volume 16 of the housing 4.

The electromechanical generator 2 uses a resonant mass-spring arrangement mounted within the housing 4. If the electromechanical generator 2 is subject to a source of external vibration that causes it to move along the direction A-A, then the magnetic core assembly 50 and the electrical coil 22 assembly each comprise a respective inertial mass which may move relative to the housing 4, also along the direction A-A. In doing so, the springs 82, 84 and 182, 184 are deformed axially, and work is done against a damper comprising the movable electrical coil and the movable magnetic core assembly that generates a region of magnetic flux within which the electrical coil is disposed. Movement of the electrical coil within the magnetic flux causes an electrical current to be induced in the electrical coil which can be used as a source of electrical power for driving an external device (not shown).

Also, although in this embodiment the springs are plate springs, other biasing elements may be employed.

The mass of the magnetic core assembly can be made to be very high relative to the size of the device, thereby to increase the overall mass density of the device as compared, for example, to a cantilever device. For a given volume to be occupied by the device, a greater moving mass can be provided. This also maximizes the electrical power output, for the reasons stated above.

By increasing the electrical output, as a result of increased magnetic coupling, the operating band width of the device can be greatly increased. This in turn greatly enhances the ability of the device to be used in many new energy harvesting applications.

Simple plate springs can be employed in the electromechanical generator. This provides a reliable and simple structure to prevent lateral movement on the magnetic core assembly and the electrical coil assembly, with low friction and avoiding complicated, intricate and/or expensive manufacturing techniques. The resultant structure is robust and compact. Since the plate springs are subjected to a very low amplitude of deformation, their mechanical properties are not especially critical, because they are never deformed anywhere near their mechanical limits of linear elastic movement, and so they can accordingly be of relatively conventional quality, and consequently have a low component cost.

Other modifications and embodiments of the present invention will be apparent to those skilled in the art.

The invention claimed is:

1. An electromechanical generator for converting mechanical vibrational energy into electrical energy, the electromechanical generator comprising an electrically conductive coil assembly having a longitudinally extending axis parallel to a central axis of the generator and a magnet assembly, each assembly being movably mounted for linear vibrational motion parallel to the central axis of the generator, and first and second biasing devices for respectively biasing the electrically conductive coil assembly and the magnet assembly in opposed directions parallel to the central axis towards a respective central position, wherein the magnet assembly comprises two magnetic circuits vertically spaced apart, a first magnetic assembly of the two magnetic circuits radially spaced inboard from an upper portion of the coil assembly and a second of the two magnetic circuits radially spaced inboard from a lower portion of the coil assembly, the magnetic flux of the magnetic circuits being in opposition.

2. An electromechanical generator according to claim 1 wherein first and second biasing devices are adapted to cause the electrically conductive coil assembly and the magnetic core assembly to have respective different natural resonant frequencies.

* * * * *